United States Patent [19]

Adam

[11] Patent Number: 6,106,936
[45] Date of Patent: Aug. 22, 2000

[54] OVERLAY MATERIAL FOR PLAIN BEARING COMPRISING FILLED FLUOROTHERMOPLASTIC MATERIAL

[75] Inventor: Achim Adam, Nauheim, Germany

[73] Assignee: Glyco-Metall-Werke, Glyco B.V. & Co. KG, Wiesbaden

[21] Appl. No.: 08/981,216

[22] PCT Filed: Jun. 25, 1996

[86] PCT No.: PCT/DE96/01154
§ 371 Date: Dec. 19, 1997
§ 102(e) Date: Dec. 19, 1997

[87] PCT Pub. No.: WO97/03299
PCT Pub. Date: Jan. 30, 1997

[30] Foreign Application Priority Data

Jul. 8, 1995 [DE] Germany ............ 195 24 968

[51] Int. Cl.[7] .................................................. B32B 5/16
[52] U.S. Cl. ................ 428/327; 428/328; 428/421; 428/473.5; 428/475.5; 428/477.7; 428/698; 428/704
[58] Field of Search .................... 428/325, 328, 428/327, 421, 698, 704, 423.5, 475.5, 477.7, 473.5, 423.1

[56] References Cited

U.S. PATENT DOCUMENTS

| | | | |
|---|---|---|---|
| 4,015,949 | 4/1977 | Baker et al. ........................ | 428/653 |
| 4,396,677 | 8/1983 | Intrater et al. ..................... | 428/408 |
| 5,093,207 | 3/1992 | Hodes et al. ...................... | 428/614 |
| 5,093,403 | 3/1992 | Rau et al. .......................... | 524/404 |
| 5,462,362 | 10/1995 | Yuhta et al. ...................... | 384/13 |
| 5,536,583 | 7/1996 | Roberts et al. ................... | 428/457 |

FOREIGN PATENT DOCUMENTS 61-261396  11/1986  Japan .

*Primary Examiner*—H. Thi Le
*Attorney, Agent, or Firm*—Reising, Ethington, Barnes, Kisselle, Learman & McCulloch, P.C.

[57] ABSTRACT

A sliding bearing material contains a matrix material and an antifriction material composed of at least one fluorinated plastic material and fillers. The antifriction material contains as fillers 5 to 48% by volume boron nitride and 2 to 45% by volume of at least one metal compound with a stratified structure, the proportion of fluorinated thermoplastic material amounting to at least 50 to 85% by volume. The fluorinated thermoplastic material is a PTFE or PTFE with additives; $M_oS_2$, tungsten, sulphide, titanium sulphide or titanium iodide may be used as metal compounds. The matrix material may be a sintered bronze into which the antifriction material is incorporated or a thermoplastic material in which the antifriction material is finely distributed. The proportion of plastic matrix material in the whole sliding bearing material lies at 60 to 95% by volume.

17 Claims, 3 Drawing Sheets

6,106,936

OVERLAY MATERIAL FOR PLAIN BEARING COMPRISING FILLED FLUOROTHERMOPLASTIC MATERIAL

BACKGROUND OF THE INVENTION

1. Field of the Invention

The invention relates to a plain bearing material comprising a matrix material and a sliding material of at least one fluorothermoplastic and fillers. The invention also relates to the use of such plain bearing materials.

2. Description of Related Art

Bearing materials with plastics-based overlays are known as single-layer, two-layer or three-layer composite materials: solid plastics bearings, bearings with an outer metallic backing and directly applied or adhered plastics, other such with inner wire meshes, as well as three-layer bearings of backing metal, a sintered porous metal layer and a covering layer formed in the pores. All these bearings are generally used in areas in which the use of lubricants is impossible or undesirable. For this reason, they must provide these lubricants themselves when in operation.

Multilayer materials differ from solid plastics materials, for example by a negligible tendency towards cold flow under load, by substantially better heat conductivity and, in connection therewith, by markedly higher possible pv values. However, solid plastics materials may also be advantageous in certain cases, e.g. for reasons of cost.

Among three-layer materials, it is possible to distinguish further between those with overlays based on fluorothermoplastics, such as polytetrafluoroethylene (PTFE), perfluoroalkoxyalkane (PFA), perfluoroethylenepropylene (FEP) etc., and those with overlays based on other plastics, such as polyetheretherketone (PEEK) for example. The latter two groups differ in their manner of operation: while, in the case of PTFE-based materials, the bronze intermediate layer is the "active" load-bearing component of the overlay and acts like a filler, the other plastics materials use it only as an anchoring means. If there is sufficient affinity to the metal backing, they permit the production of true two-layer materials, but may also be applied with the aid of an adhesive. On the active overlay itself the thermoset or thermoplastics material then assumes the supporting role of the bronze. Bearing materials of filled fluorothermoplastic films adhered to metal or other such materials with wire meshes incorporated in plastics are also known, which may likewise be adhered to a metal backing.

For universal applicability and ease of production, the most advantageous materials are three-layer materials based on fluorothermoplastics such as PTFE, which also exhibit the highest performance and temperature-resistance. In the production process, homogeneous PTFE/filler pastes are produced by means of a plastics dispersion and the final composite material is produced by a concluding step comprising sintering of the PTFE subsequent to rolling thereof onto the backing material.

The most commonly used fillers for such materials are lead and molybdenum disulphide, these materials providing virtually equal performance levels. These fillers may also be used in the presence of lubricants.

In many cases, it would be desirable to be able to solve constructional problems by using maintenance-free, space-saving plain bearings with PTFE overlays. However, the upper load limit, which, at a pv value of 2 MPa m/s, lies within the average loading and speed range (0.5–100 MPA and 0.02–2 m/s), may restrict use of these plain bearings.

It is known from DE 41 06 001 A1 that plain bearing materials with better performance levels may be also produced by using PbO as the filler, but there is a growing stigma attached to the use of materials, such as lead, which are potentially damaging to health. Furthermore, such materials, which are of optimum suitability for lubricant-free use, are unsuited for example to use as guide bushings for shock absorber piston rods, because under these conditions they do not exhibit the necessary wear and cavitation resistance or else their coefficients of friction are unsatisfactorily high.

Bearing materials with overlays consisting only of PTFE and molybdenum disulphide have long been known and are currently some of the most frequently used lubricant-free bearing materials. Boron nitride, which is known to be a solid lubricant, is also repeatedly named as a possible filler for PTFE despite the fact that the lubricant properties then only become effective at temperatures of over 800° C.

Thus, both molybdenum sulphide and boron nitride are already mentioned in DE-PS 11 32 710 as Examples in a list of solid lubricants. The simultaneous use of molybdenum disulphide and boron nitride in PTFE is not mentioned, however.

SUMMARY OF THE INVENTION

The problem on which the invention is based is that of providing a filler combination which extends the above-mentioned advantages of thermoplastics-containing plastics bearing materials without recourse to lead or lead compounds.

This problem is solved in that the sliding material contains as fillers from 5–48 vol. % boron nitride and from 2–45 vol. % of at least one metal compound with a laminar structure, the proportion of fluorothermoplastics amounting to from 50–85 vol. %. The volume percentages are based on the sliding material without the matrix material.

It has been shown that, by using a filler combination of boron nitride, wherein boron nitride in its hexagonal modification is preferred, and at least one metal compound with a laminar structure, the properties of plastics bearing materials may be markedly improved over bearing materials which contain only one of these fillers. These properties include, in particular, loadability, wear resistance and cavitation resistance.

The laminar structure of the metal compounds should be understood to mean anisotropy of the crystal lattice such that displacement of certain lattice planes with respect to each other is made easier by weak interactions of the constituent parts of the atom upon the application of external force. Possible metal compounds are, for example, molybdenum disulphide and/or tungsten sulphide and/or titanium sulphide and/or titanium iodide.

The fluorothermoplastics are preferably PTFE or PTFE with the addition of one or more fluorothermoplastics selected from ethylene-tetrafluoroethylene (ETFE), polychlorotrifluoroethylene (PCTFE), ethylenechlorotrifluoroethylene (ECTFE), polyvinylidene fluoride (PVDF) or FEP.

The advantageous properties are particularly obvious when the matrix material is a bronze framework into which the sliding material is inserted, or when the matrix material is a thermoplastic into which the sliding material is mixed in fine dispersion, the proportion of plastics matrix material based on the total plain bearing material amounting to from 60–95 vol. %, preferably from 70–90 vol. %.

The plastics matrix material preferably comprises polyphenylenesulfide (PPS), polyamide (PA), polyvinylidene fluoride (PVDF), polysulfone (PSU), polyethersulfone (PES), polyetherimide (PEI), PEEK, polyamideimide (PAI) or polyimide (PI).

In PTFE/sintered bronze-based plain bearing materials the performance level is so improved that, under lubricant-free conditions, pv values may be achieved in the average load and speed range of up to 5 MPa m/s. At the same time, these materials are distinguished by improved cavitation resistance and by coefficients of friction with oil lubrication which are comparable to the prior art. Even with fluorothermoplastics-containing materials with a different plastics matrix, such as PPS, PA, PVDF, PSU, PES, PEI, PEEK, PAI or PI, the filler combination according to the invention may provide a marked improvement in wear resistance in comparison with variants filled with single components.

The proportion of boron nitride is preferably between 6.25 and 32 vol. % and that of the metal compound is preferably between 5 and 30 vol. %. The particle size of these fillers is preferably below 40 µm, especially below 20 µm.

Proportions other than those according to the invention do not provide any substantial improvements over the combinations of PTFE and boron nitride or PTFE and $MoS_2$. However, it is possible, starting with the above-mentioned compositions, to replace up to 40 vol. % of the boron nitride/metal sulphide filler combination, but preferably not more than 20 vol. %, with other components such as thermoset or high temperature thermoplastics materials, such as polyimides or polyamide imides for example, other solid lubricants, e.g. graphite, pigments such as coke for example, and fibrous materials such as short graphite fibres or aramid fibres or hard substances such as boron carbide or silicon nitride for example.

The sliding material according to the invention may be used in conjunction with a matrix material of thermoplastics as a solid plastics sliding element. However, the plain bearing material may also find use as an overlay for a multilayer material, it being possible to apply the overlay directly to a metal backing. The latter multilayer materials with an overlay comprising a sintered bronze matrix are so constructed that a 0.05–0.5 mm thick layer of bronze is sintered onto the backing metal, such as steel or a copper or aluminium alloy for example, in such a way that it comprises a pore volume of from 20–45% and the composition of the bronze itself contains from 5–15% tin and optionally up to 15% lead. The sliding material mixture is then applied by rolling onto the porous substrate in such a way that the pores are completely filled and, depending on the use to which it is going to be put, a 0–50 µM thick covering layer arises. The material is then subjected to heat treatment in an oven, during which the PTFE obtained is sintered for three minutes at 380° C. in order, in a concluding rolling step, to produce the final composite and the necessary final dimensions.

BRIEF DESCRIPTION OF THE DRAWINGS

Exemplary embodiments are described in more detail below with the aid of the Figures and Tables. In the Figures.

DETAILED DESCRIPTION OF THE PREFERRED EMBODIMENTS

The sliding material mixture may be produced, as is described in Example 1 below, by means of a PTFE dispersion, to which the fillers are added in such a way that they are in homogeneous dispersion when coagulation is subsequently effected. A pasty composition then arises, which comprises the properties necessary for the subsequent coating process.

EXAMPLE 1

12 l of water, 25 g sodium lauryl sulphate, 3 kg boron nitride, 15.9 kg molybdenum sulphide and 34 kg of a 35% PTFE dispersion are stirred vigorously for 20 minutes. 100 g of a 20% aluminium nitrate solution are then added. After the completion of coagulation, 1 l toluene is stirred into the mixture and the escaped fluid is removed.

The other Examples cited in Tables 1 to 4 from the group comprising three-layer systems with a PTFE/bronze matrix overlay may all be produced in this way. Below, therefore, only the compositions of the plastics mixtures are mentioned.

The materials produced in the manner described are markedly superior in the compositions according to the invention to the standard materials based on $PTFE/MoS_2$ or PTFE/Pb with respect to both the coefficient of friction and wear resistance.

In order to examine properties such as wear resistance and the coefficient of friction, the compositions of PTFE, boron nitride and molybdenum disulphide were varied over a wide range and samples of the above-described three-layer materials were produced comprising 1.25 mm steel, 0.23 mm bronze and 0.02 mm of a plastics covering layer. The rates of wear of these samples at a peripheral speed of 0.52 m/s and under a load of 17.5 MPa were measured using 0.78 cm² specimens and a pin/roller tribometer and compared with a standard material. The standard material used was a composite material of the above-described type with a plastics layer consisting of 80 vol. % PTFE and 20 vol. % $MoS_2$.

Figure 1:
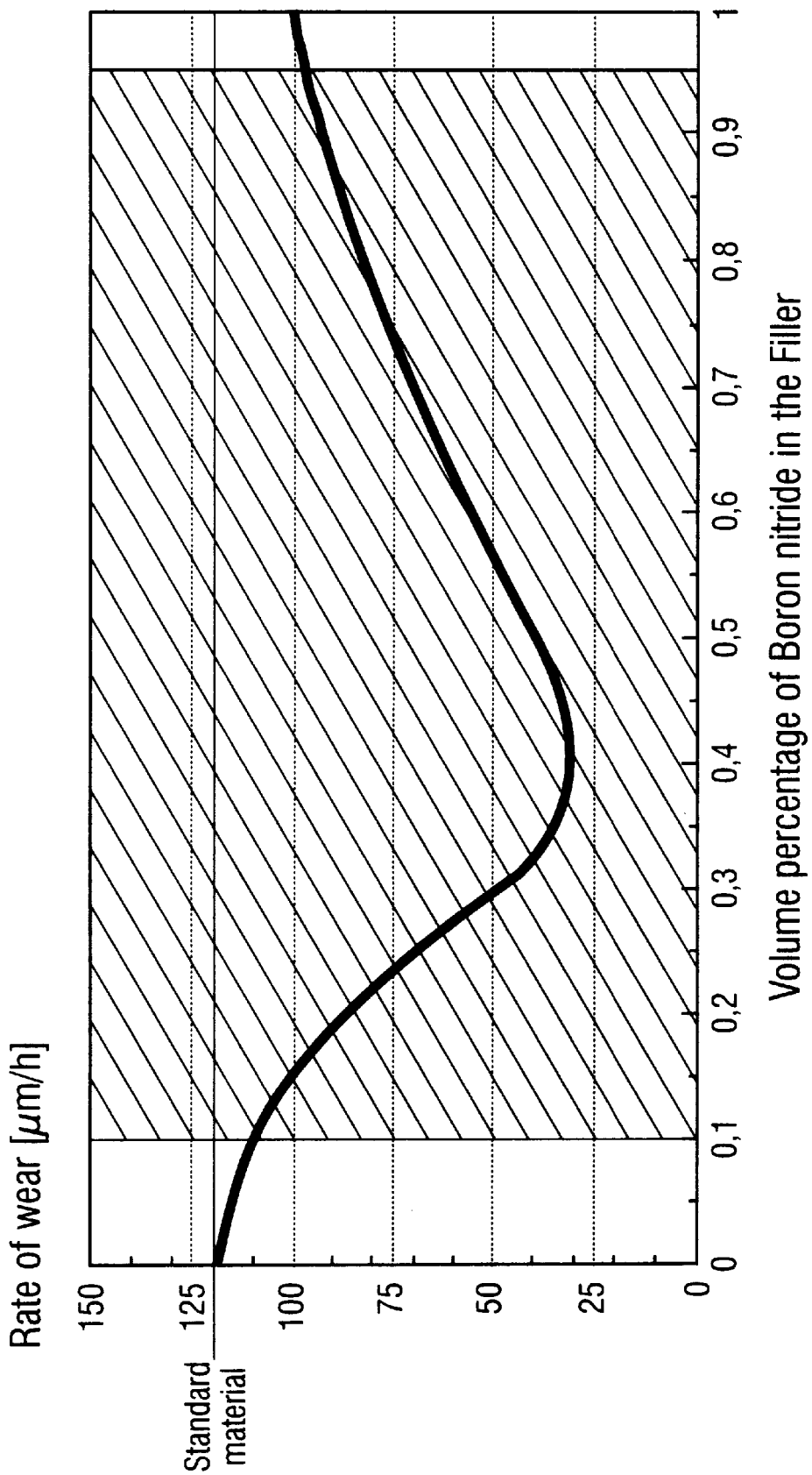
FIG. 1 shows the rate of wear in dependence on the boron nitride content of the filler.

FIG. 1 shows the rate of wear in dependence on the boron nitride content of the filler, the total filler being kept constant at 30 vol. %. It may be clearly seen that, within the hatched range according to the invention, there is a pronounced point of minimum wear which reveals the compositions at their best to be approximately four times as good as those which contain only molybdenum sulphide for example.

Figure 2:
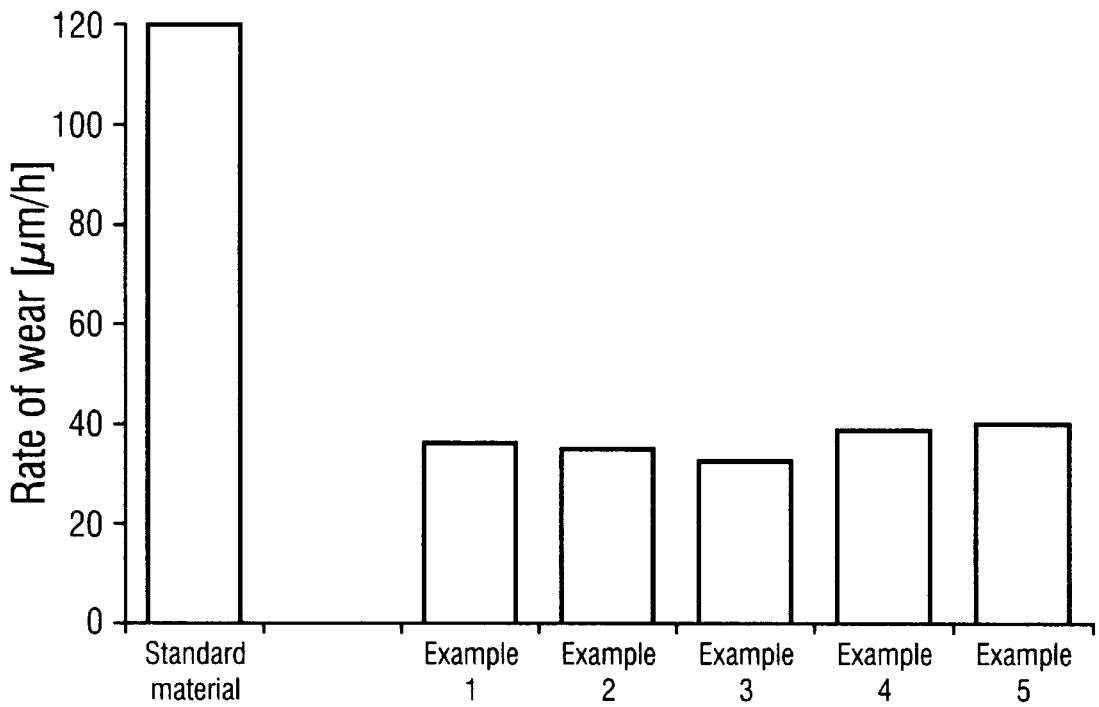
FIGS. 2–5 are graphic representations of the test results assembled in the Tables.

To clarify the improvements achievable according to the invention, the material compositions listed in Table 1 together with the coefficients of friction and rates of wear obtained by the pin/roller test were additionally tested. FIG. 2 graphically compares the results, which show that the filler combination performs better in every instance than just one of the two components.

Figure 3:
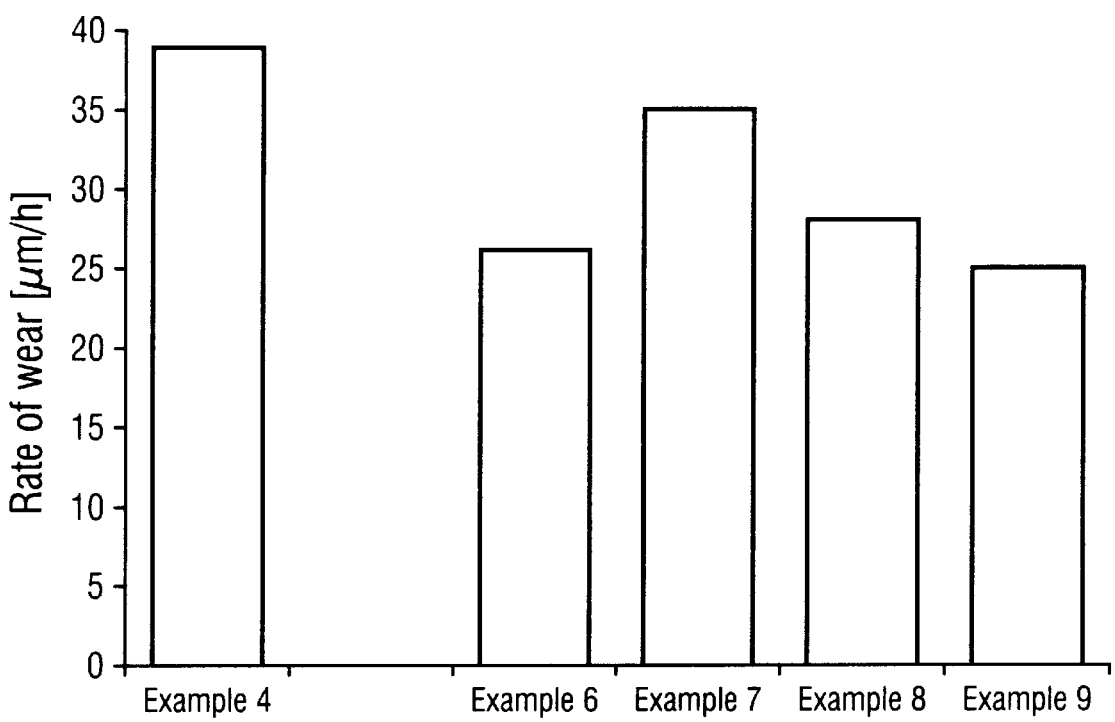

It may be seen from the results obtained with example compositions 7–11 and listed in Table 2 and FIG. 3 that the materials according to the invention may also be combined with other components without the positive properties being lost. It may be seen that further improvements may be achieved by such additions.

Furthermore, the efficacy of tungsten sulphide was tested. The corresponding result from the pin/roller test stand is shown in Table 3. It is clear that, to achieve the effect according to the invention, other materials which are structurally similar to molybdenum disulphide may also be suitable.

Figure 4:
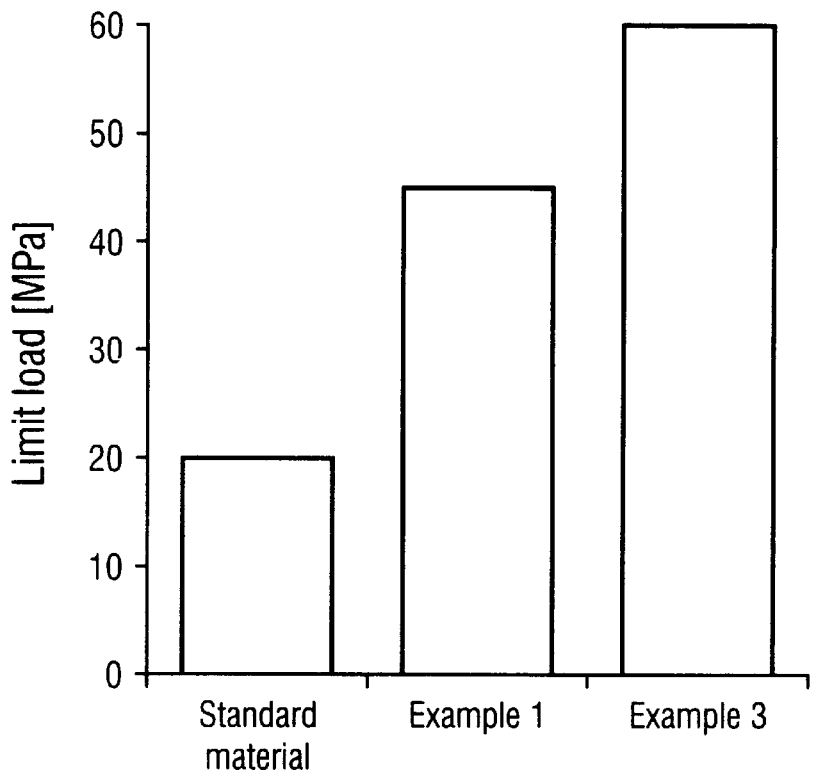

Bushings 22 mm in diameter were produced from example compositions nos. 1 and 3 and their loadability limit was tested in a rotating test run. The highest possible load at which a running distance of 13.5 km was achieved at a speed of 0.075 m/s was defined as the limit load. The failure criterium was a sharp rise in temperature, which proved, on subsequent examination, to be synonymous with an average wear depth of 90 μm. The result of sample 3 corresponds, when differently evaluated, to a pv value of 4.5 MPa m/s. In FIG. 4 the results are compared with the prior art.

Table 4 makes it plain that the performance of the materials according to the invention when used in shock absorbers is equal to the prior art. Both the cavitation resistance and the coefficient of friction are of comparable level. The Table is based on a shock absorber testing program with extreme levels of cavitation stress. The failure criterium in the determination of service life was here complete and partial sliding surface detachment. The coefficients of friction were determined using bushings with the above-mentioned dimensions operating against shock absorber piston rods under a 1000 N load and at a sliding speed of 20 mm/s. Drip feed lubrication was provided.

Another possible way of advantageously realising the invention comprises incorporating the sliding material mixtures with PTFE according to the invention into a thermoplastic matrix of another polymer such as, for example, PPS, PA, PVDF, PES, PSU, PEEK, PI, PA or PEI and then processing this combination in any desired way to form a sliding element, e.g. applying it to a metal backing with or without a bronze intermediate layer or producing solid plastics parts. The thermoplastics content may vary between 60 and 95 vol. %, preferably between 70 and 90 vol. %.

The fluorothermoplastics/boron nitride/molybdenum disulphide mixture according to the invention, in the form of a dry blend, is dispersed over a steel/bronze substrate and fused and rolled thereon. However, it is also possible to produce the mixture by melt compounding. The influence on the tribological properties of a PES compound serves as the example here, but many other thermoplastics may also be used as the matrix.

Figure 5:
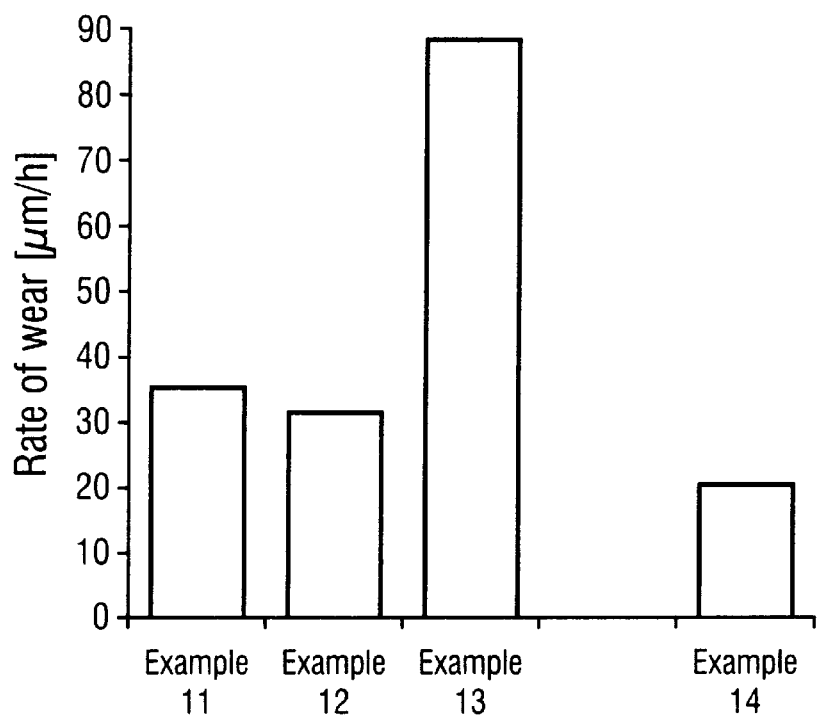

To clarify the effect according to the invention, FIG. 5 shows the coefficients of friction and the wear values of PES compounds with PTFE, PTFE/MoS$^2$, PTFE/BN and PTFE/BN/MoS$_2$. The precise compositions and measured values are give in Table 5. The best values are achieved by Example 14.

TABLE 1

| Ex. No. | Composition in vol. % | Wear [μm/h] | Coefficient of friction |
|---|---|---|---|
| PRIOR ART | PTFE 80, MoS$_2$ 20 | 120 | 0.20 |
| 1 | PTFE 55, BN 12.8, MoS$_2$ 32.2 | 36 | 0.23 |
| 2 | PTFE 60, BN 20, MoS$_2$ 20 | 35 | 0.23 |
| 3 | PTFE 65, BN 12.5, MoS$_2$ 22.5 | 32 | 0.21 |
| 4 | PTFE 70, BN 15, MoS$_2$ 15 | 39 | 0.23 |
| 5 | PTFE 75, BN 7.2, MoS$_2$ 17.8 | 40 | 0.20 |

TABLE 2

| Ex. No. | Composition in vol. % | Wear [μm/h] | Coefficient of friction |
|---|---|---|---|
| 4 (for comparison) | PTFE 70, BN 15, MoS$_2$ 15 | 39 | 0.23 |
| 6 | PTFE 70, BN 13, MoS$_2$ 13, Coke 4 | 26 | 0.18 |
| 7 | PTFE 70, BN 13, MoS$_2$ 13, Si$_3$N$_4$ 4 | 35 | 0.24 |
| 8 | PTFE 70, BN 13, MoS$_2$ 13, C fibres 4 | 28 | 0.21 |

TABLE 2-continued

| Ex. No. | Composition in vol. % | Wear [μm/h] | Coefficient of friction |
|---|---|---|---|
| 9 | PTFE 70, BN 13, MoS$_2$ 13, PI 4 | 25 | 0.18 |

TABLE 3

| Ex. No. | Composition in vol. % | Wear [μm/h] | Coefficient of friction |
|---|---|---|---|
| 4 (for comparison) | PTFE 70, BN 15, MoS$_2$ 15 | 39 | 0.23 |
| 10 | PTFE 70, BN 15, WS$_2$ 15 | 36 | 0.22 |

TABLE 4

| Ex. No. | Composition in vol. % | Wear [μm/h] | Coefficient of friction |
|---|---|---|---|
| prior art | PTFE 80, MoS$_2$ 20 | 37 | 0.018 |
| 3 | PTFE 65, BN 12.5, MoS$_2$ 22.5 | 40 | 0.020 |
| 5 | PTFE 75, BN 7.2, MoS$_2$ 17.8 | 33 | 0.019 |

TABLE 5

| Ex. No. | Composition in vol. % | Wear [μm/h] | Coefficient of friction |
|---|---|---|---|
| 11 | PES 80, PTFE 20 | 35 | 0.18 |
| 12 | PES 80, PTFE 14, MoS$_2$ 6 | 31 | 0.18 |
| 13 | PES 80, PTFE 14, BN 6 | 88 | 0.17 |
| 14 | PES 80, PTFE 14, BN 3, MoS$_2$ 3 | 20 | 0.15 |

Obviously, numerous modifications and variations of the present invention are possible in the light of the above teachings. It is therefore to be understood that within the scope of the appended claims, the invention may be practiced otherwise than as specifically described herein.

What is claimed is:

1. A plain bearing material comprising a matrix material and a composite sliding material, said sliding material including a proportion of at least one fluorothermoplastic material ranging in volume percent from 50 to 85% and a proportion of fillers comprising 5 to 48 vol. % boron nitride and said fillers further comprising between 2 to 45 vol. % of at least one metal compound having a laminar structure and wherein the vol. % of said fillers is expressed in relation to the total volume of the sliding material.

2. The plain bearing material of claim 1 wherein said fluorothermoplastic material comprises polytetrafluoroethylene (PTFE).

3. The plain bearing material of claim 1 wherein said fluorothermoplastic material comprises PTFE and at least one fluorothermoplastics selected from the group consisting of: ethylene-tetrafluoroethylene (ETFE).

4. The plain bearing material of claim 1 wherein said at least one compound is selected from the group consisting essentially of: molybdenum sulfide, tungsten sulfide, titanium sulfide, and titanium iodide.

5. The plain bearing material of claim 1 wherein said boron nitride is present in hexagonal modification.

6. The plain bearing material of claim 1 wherein said proportion of boron nitride ranges from 6.25 to 32 vol. % and the proportion of said metal compound ranges from 5 to 30 vol. %.

7. The plain bearing material of claim 1 wherein said fillers have a particle size of less than 40 μm.

8. The plain bearing material of claim 1 wherein said fillers have a particle size less than 20 μm.

9. The plain bearing material of claim 1 wherein said sliding material includes up to 40 vol. % additives other than said boron nitride/metal compound filler combination.

10. The plain bearing material of claim 9 wherein said additives include materials selected from the group consisting essentially of: hard substances including silicon nitride and boron carbide, pigments including coke, fibrous materials including short graphite fibers and aramid fibers, solid lubricants including graphite, and high temperature thermoplastics including polyamideimide (PAI) and polyimide (PI).

11. The plain bearing material of claim 1 wherein said matrix material comprises a porous bronze framework into which said sliding material is introduced.

12. The plain bearing material of claim 1 wherein said matrix material comprises a thermoplastic in which said sliding material is dispersed.

13. The plain bearing of claim 12 wherein said thermoplastic matrix material is present in the range of about 60 to 95 vol. % based on the total volume of plain bearing material.

14. The plain bearing material of claim 12 wherein said thermoplastic matrix material is selected from the group of materials consisting essentially of: PPS, PA, PVDF, PSU, PES, PEI, PEEK, PAI, and PI.

15. A solid plastics sliding element comprising a matrix material and a composite sliding material, said sliding material including a proportion of at least one fluorothermoplastic material ranging in volume percent from 50 to 85% and a proportion of fillers comprising 5 to 48 vol. % boron nitride and said fillers further comprising between 2 to 45 vol. % of at least one metal compound having a laminar structure and wherein the vol. % of said fillers is expressed in relation to the total volume of the sliding material.

16. A plain bearing comprising a metal backing and an overlay applied to said backing, said overlay comprising a matrix material and a composite sliding material, said sliding material including a proportion of at least one fluorothermoplastic material ranging in volume percent from 50 to 85% and a proportion of fillers comprising 5 to 48 vol. % boron nitride and said fillers further comprising between 2 to 45 vol. % of at least one metal compound having a laminar structure and wherein the vol. % of said fillers is expressed in relation to the total volume of the sliding material.

17. A plain bearing material comprising a matrix material and a composite sliding material, said sliding material including a proportion of at least one fluorothermoplastic material ranging in volume percent from 50 to 85% and a proportion of fillers comprising 5 to 48 vol. % boron nitride and said fillers further comprising between 2 to 45 vol. % of at least one metal compound having a laminar structure selected from the group consisting of $MoS_2$, tungsten sulfide, titanium sulfide, and titanium iodide and wherein the vol. % of said fillers is expressed in relation to the total volume of the sliding material.

* * * * *

UNITED STATES PATENT AND TRADEMARK OFFICE
CERTIFICATE OF CORRECTION

PATENT NO.   : 6,106,936
DATED        : August 22, 2000
INVENTOR(S)  : Achim Adam It is certified that error appears in the above-identified patent and that said Letters Patent is hereby corrected as shown below:

Column 6, claim 3,
Should read as follows:
3. The plain bearing material of claim 1 wherein said fluorothermoplastics material comprises PTFE and at least one fluorothermoplastics selected from the group consisting of: ethylene-tetrafluoroethylene (ETFE), polychlorotrifluoroethylene (PCTFE), ethylene-chlorotrifluoroethylene (ECTFE), polyvinylidene fluoride (PVDF), and perfluoroethylene-propylene (FEP).

Claim 14,
Should read as follows:
14. The plain bearing material of claim 12 wherein said thermoplastic matrix material is selected from the group of materials consisting of: polyphenylenesulfide (PPS), polyamide (PA), polyvinylidene fluoride (PVDF), polysulfone (PSU), polyethersulfone (PES), polyetherimide (PEI), polyetheretherketone (PEEK), polyamideimide (PAI), and polyimide (PI).

Signed and Sealed this

Twenty-third Day of October, 2001

*Attest:*

*Attesting Officer*

NICHOLAS P. GODICI
*Acting Director of the United States Patent and Trademark Office*